United States Patent [19]

Schott

[11] 3,831,725
[45] Aug. 27, 1974

[54] HYDRAULIC CLUTCH PRESSURE MODULATOR

[75] Inventor: Robert E. Schott, New Berlin, Wis.

[73] Assignee: Allis-Chalmers Corp., Milwaukee, Wis.

[22] Filed: Dec. 18, 1972

[21] Appl. No.: 316,364

[52] U.S. Cl. ............................. 192/87.13, 192/3.27
[51] Int. Cl. ............................................. F16d 25/10
[58] Field of Search ........... 192/87.13, 87.17, 87.18, 192/3.27

[56] References Cited
UNITED STATES PATENTS

| | | | |
|---|---|---|---|
| 2,920,732 | 1/1960 | Richards et al. | 192/87.18 |
| 2,946,241 | 7/1960 | Snyder | 192/87.18 |
| 3,182,775 | 5/1965 | Schall | 192/3.27 |
| 3,199,647 | 8/1965 | Staab | 192/87.19 |
| 3,262,529 | 7/1966 | Kramer | 192/87.18 |
| 3,389,770 | 6/1968 | Golan et al. | 192/87.13 |
| 3,527,328 | 9/1970 | Maurice | 192/87.19 |
| 3,550,507 | 12/1970 | Schott | 192/87.13 |

*Primary Examiner*—Samuel Scott
*Assistant Examiner*—Wesley S. Ratliff, Jr.
*Attorney, Agent, or Firm*—Arthur L. Nelson

[57] ABSTRACT

A pressure modulator for a hydraulic valve to modulate the pressure of the hydraulic fluid supplied to two clutches as the transmission of power is transferred from one clutch to another.

10 Claims, 2 Drawing Figures

HYDRAULIC CLUTCH PRESSURE MODULATOR

This invention relates to a hydraulic valve and more particularly to a hydraulic pressure modulator for modulating a decrease in pressure of pressurized fluid for actuating of a first clutch while modulating an increase in pressure of pressurized fluid for actuating of a second clutch for transferring of power from the first clutch to the second clutch.

During the process of transferring the power from one shaft to another in clutches, it is fundamental that the transfer of power should be smooth and gradual. With a smooth and gradual transfer of power from one shaft to another any sudden acceleration or deceleration of the rotating mass is avoided. This is generally accomplished by permitting a limited amount of slippage between the clutch plates as the power is transmitted from the driving shaft to the driven shaft. With the use of hydraulically actuated clutches this can be accomplished by reducing the initial pressure of the pressurized fluid in the hydraulic actuator on the clutch. Once the clutch is engaged, the pressure in the hydraulic actuator is gradually increased until no slip is present between the driving and the driven clutch plates.

With the drive shaft driving through alternate driven shafts transfer of power is accomplished by gradually decreasing the pressurized fluid in the hydraulic actuator of the clutch transferring the power to the second clutch which is taking over the load by a gradual increase in pressure during the transfer of power. At some point the gradually decreasing pressure in the first clutch causes the load to be carried by the clutch having the gradual increasing pressure. This gradual transfer of power is preferably transferred automatically since the operator is generally occupied with other operations.

Accordingly, this invention provides for the simultaneous decrease in pressure of the first clutch which is releasing the power to the second clutch in which the pressure is gradually increasing. As the pressures in the two clutch actuating chambers become approximately equal, the power is then shifted from the one to the other and beyond this point the first clutch is ineffective in driving the driven shaft while the second clutch accepts the total load and provides transmission of power at the rate of speed of the second clutch.

Accordingly, it is an object of this invention to provide a pressure modulator for a hydraulic valve to operate a hydraulic clutch.

It is another object of this invention to provide a multiple position valve at a pressure modulator for controlling the transmission of power from one clutch to another clutch.

It is a further object of this invention to provide an accumulator operated pressure reducing valve for supplying pressurized fluid to a modulating chamber to operate a first clutch while a second accumulator operated pressure reducing valve releases pressurized fluid in the second modulating chamber for operating a second clutch to thereby transfer the transmission of power from the second clutch to the first clutch.

The objects of this invention are accomplished by providing a first pressure reducing valve between the control valve which supplies the pressurized fluid from the pump and a first pressure modulating chamber for operating a first hydraulic clutch. The pressure reducing valve is operated in response to pressure in an accumulator having a variable volume chamber variable in response to the pressure in the chamber operating against a resilient member. The resilient member in turn operates against the pressure reducing valves to control the inlet pressure supplied to the modulating chamber. A second pressure reducing valve is connected between the control valve and a second pressure modulating chamber. The second pressure modulated chamber is also controlled in response to a spring biased accumulator plunger which varies the flow from the source pressurized fluid into the second modulating chamber. A second pressure reducing valve is formed on each of the pressure reducing valve sleeves to provide a means for discharge of fluid to the sump in response to a spring biased accumulator plunger causing a decreasing pressure in the modulating chamber of the first modulating chamber while the other pressure reducing valve which is connected between the source of pressurized fluid and the other modulating chamber is gradually increasing in pressure so the clutch connected to the modulating chamber of the highest pressure will accept the load while the other clutch becomes disengaged. In this manner the transmission of power is shifted from one clutch to another by merely shifting the control valve to the first or second position for actuating the first or second clutch and deactivating the other clutch simultaneously.

The preferred embodiment of this invention is illustrated in the attached drawings.

Figure 1:
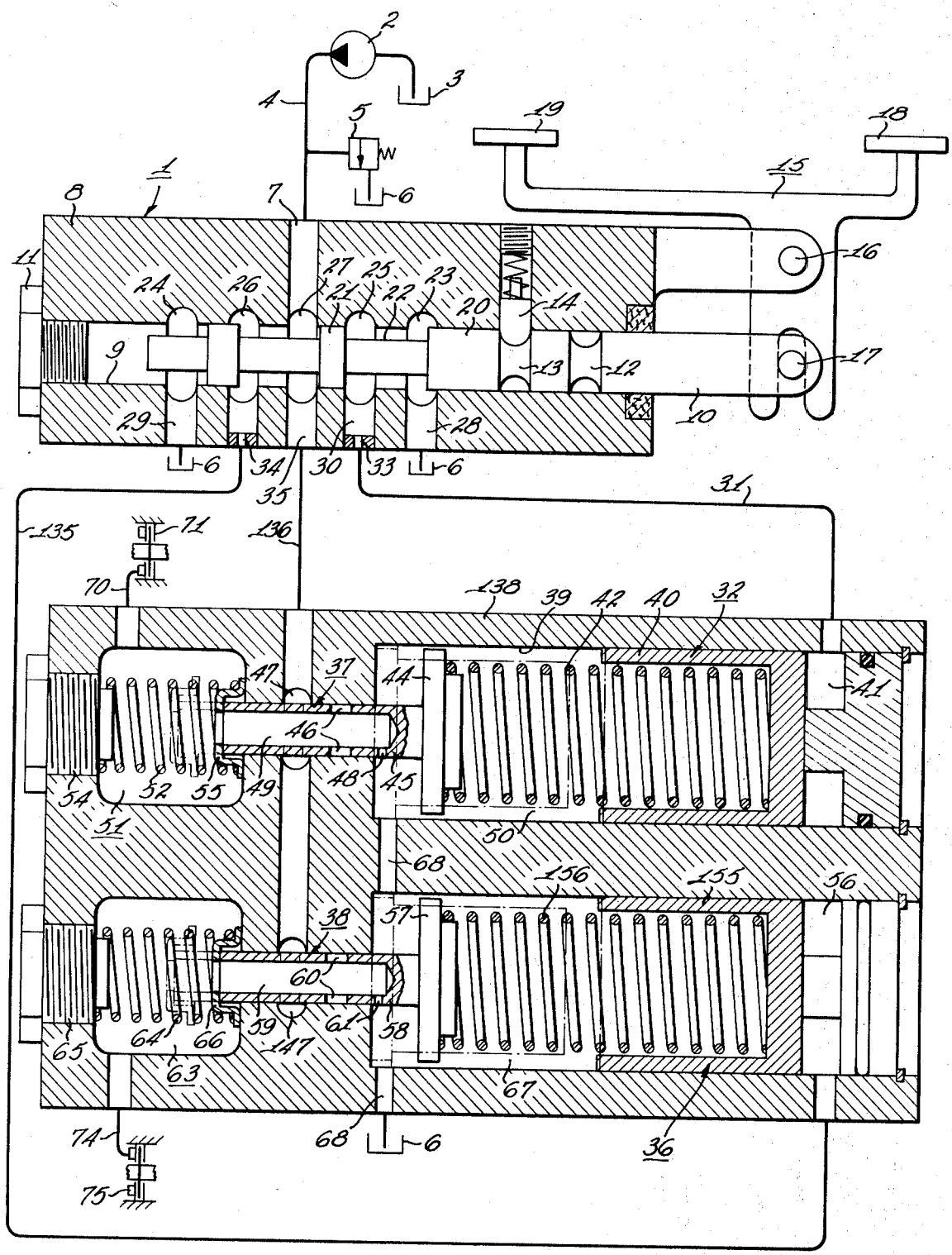
FIG. 1 illustrates a cross-section view of the control valve and the modulator for selectively operating one of two clutches.

Referring to the drawings a control valve 1 is connected to a pump 2 which receives hydraulic fluid from the reservoir 3. The pump pressurizes fluid in the conduit 4 which is connected through a relief valve 5 to the reservoir 6. The conduit 4 is also connected to the passage 7 of the control valve 1. The control valve includes the valve housing 8 forming a cylindrical opening 9 for receiving the spool 10. The plug 11 closes the left-hand end of the cylindrical opening 9. The spool 10 is formed with a pair of annular recesses 12 and 13 for selectively receiving the detent 14. The manual control lever 15 is pivotally mounted on the pivot pin 16 and engages a pin 17 for selectively moving a spool 10 axially within the valve housing 8. The lever 15 includes the foot pads 18 and 19 for selectively positioning the spool valve in the housing 8. A spool 10 also forms the lands 20 and the land 21 intermediate of which is formed the groove 22 for selectively connecting the accumulator supply chamber to the pump or sump. The valve housing 8 also forms the sump chambers 23 and 24. Accumulator supply chambers 25 and 26 are formed in the valve housing 8 as well as the high pressure chamber 27. The sump passage 28 is connected between the sump chamber 23 and sump 6. The sump passage 29 is connected between sump chamber 24 and sump 6.

The passage 30 is connected between the accumulator supply chamber 25 and conduit 31. Conduit 31 is connected to the accumulator 32. The orifice 33 is formed in the passage 30.

The accumulator supply chamber 26 is connected through the orifice 34 and conduit 135 to the accumulator 36. A high pressure passage 7 and high pressure chamber 27 are connected through the passage 35 and conduit 136 to the pressure limiting valves 37 and 38.

Accumulator 32 is formed in the accumulator housing 138 forming a cylindrical bore 39 receiving the plunger 40. The plunger 40 forms a variable volume chamber 41 with the housing 138. The spring 42 is positioned between the plunger 40 and the spring retainer 44 formed on the valve sleeve 45.

The valve sleeve 45 forms a radial inlet port 46 for selective communication with the chamber 47. The discharge port 48 selectively connects the central opening 49 of the sleeve 45 with accumulator opening 50.

The modulating chamber 51 encloses a spring 52 which is compressively positioned between the plug 54 and the spring seat 55 which bears against the valve sleeve 45.

Similarly the accumulator 36 is formed in the accumulator housing 138. The plunger 155 forms a variable volume chamber 56 with the housing 138. The spring 156 is compressively positioned between the spring retainer 57 on the valve sleeve 58 and plunger 155. The valve sleeve 58 forms a central opening 59 and the inlet port 60 and the discharge port 61.

The housing 138 forms a modulating chamber 63 which receives the spring 64 which is compressively positioned between the plug 65 and the spring seat 66. The spring seat 66 is positioned on the valve sleeve 58. The accumulator chamber 50 and the accumulator chamber 67 are in communication with sump 6 through passage 68. The modulating chamber 51 is connected through the conduit 70 to the clutch 71. The modulating chamber 63 is in communication through the conduit 74 to the clutch 75.

Figure 2:
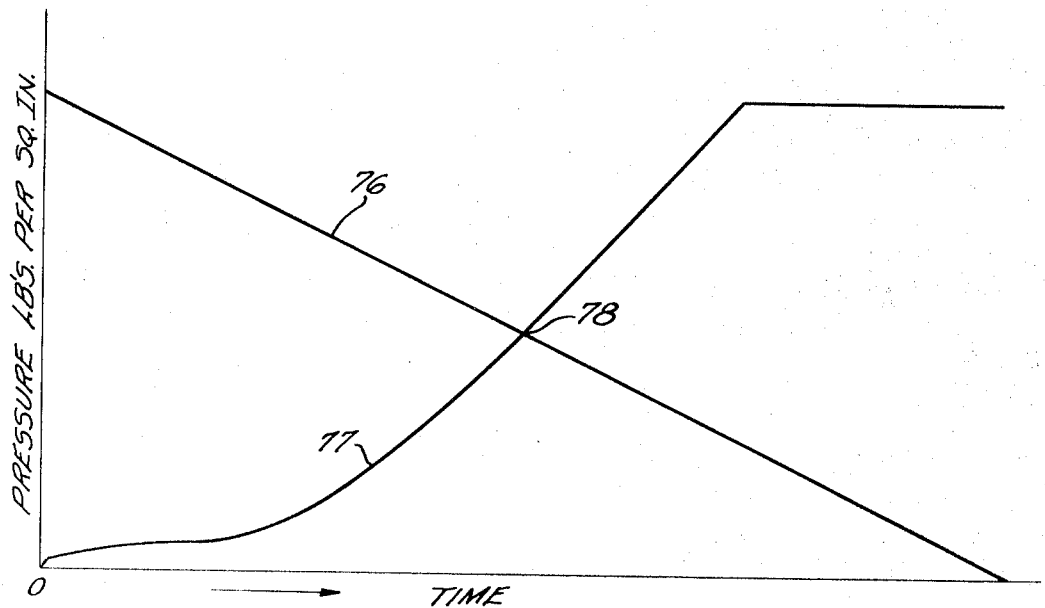
FIG. 2 illustrates the pressure rise and decay in the first and second modulators which control the two clutches.

Referring to FIG. 2 a chart illustrates pressure changes in the two modulating chambers 51 and 63 when one of the clutches disengages and while simultaneously engaging the other clutch. The cycle is the same for either of the modulators depending on which cycle is activated. A decrease in pressurized fluid in the modulating chamber connected to the first clutch decreases at the rate as indicated by a line 76. Sumultaneously, the pressure in the second modulating chamber connected to the second clutch increases at the rate indicated by the line 77. Since the one modulating chamber pressure is increasing while the second modulating chamber pressure is decreasing at some point 78 the pressures are equalized. Beyond this point the pressures in the modulating chamber which are increasing will cause the corresponding clutch to engage and carry the load while the other clutch will disengage as the pressure in the corresponding modulating chamber decreases.

The preferred embodiment of this invention will be described in the following paragraphs.

The pump 2 supplies pressurized fluid to the inlet passage 7 and the high pressure chamber 27 in the manually operated control valve 1. The high pressure fluid from the pump 2 is supplied through the conduit 136 to the chambers 47 and 147 in the modulator. The manually controlled lever 15 operates the spool 10 of the manually controlled valve 1. With the spool 10 of the manually controlled valve 1 in a position shown, high pressure fluid is supplied through conduit 135 to the accumulator 36 which will bias the piston 155 to a maximum volume position and place communication between chamber 147 through the port 60 to the modulating chamber 63. It is understood, however, that this is a time delay reaction as the plunger 155 moves to a maximum volume position. Initially, the port 60 is not in communication with chamber 147 and will not be in this position until the plunger 155 moves in the left-hand direction. The pressure gradually builds up in the chamber as indicated by the line 77 as shown in FIG. 2. A pressure reducing valve formed by the port 60 in sleeve 58 will regulate the flow of pressurized fluid into the modulating chamber 63 to gradually increase the pressure as indicated in FIG. 2. Eventually, the plunger 155 moves to the maximum volume position of chamber 56 and the valve sleeve 58 moves in the left-hand direction. The pressure in the modulating chamber 63 eventually builds up to a maximum pressure in which the clutch 75 is fully engaged and the full pressure of the system is applied for in engagement of the clutch.

When the operator desires to shift the load from the clutch 75 to clutch 71 the manual control lever 15 is shifted by operating the foot pedal pad 18 biasing the spool 10 in the left-hand direction so the detent 14 engages the annual groove 12. The spool is shifted so that communication is provided between the high pressure chamber 27 and the accumulator supply chamber 25. Pressurized fluid flows through the conduit 31 into the accumulator chamber 41. Simultaneously, with this movement of the spool, the accumulator supply chamber 26 is connected to the sump chamber 24 and the pressure in the accumulator chamber 26 is released and allowed to flow to sump 6. This permits the plunger 155 to move in the right-hand direction to a decreasing volume position.

Referring to the operation of the accumulator 32, the pressure in the accumulator chamber 41 biases the plunger 40 in the left-hand direction forcing the spring 42 to cause the valve sleeve 45 to place communication of the chamber 47 through port 46 to the modulating chamber 51. The pressure in the modulating chamber 51 gradually builds up as indicated by the line 77 in FIG. 2. The plunger 40 moves to a maximum volume position biasing the valve sleeve to a left-hand position placing continuous communication between the chamber 47, port 46 and passage 49 to the modulating chamber 51. In this position, the clutch 71 is fully engaged.

Sumultaneously with the operation as described of accumulator 32, the accumulator 36 is also providing a decreasing pressure in the modulating chamber 63. When the variable volume chamber 56 is in communication with passage 24 the spring 156 biases the plunger 155 to a decreasing volume position. This in turn permits the pressure reducing valve sleeve 58 to move in the right-hand direction. This in turn terminates communication between the chamber 147 and the passage 59 through port 60. When this condition exists, pressure is no longer supplied to the modulating chamber 63 and as the sleeve moves further in the right-hand direction, communication is provided between the modulating chamber 63, passage 59 and discharge port 61 to the accumulator chamber 67 and sump 6. The pressure in the modulating chamber 63 is relieved as the pressure is discharged through the discharge port 61 and the pressure decreases as indicated by the line 76 in FIG. 2. Eventually, the pressure is completely released in the modulating chamber and the clutch 75 is completely disengaged.

At some point in the modulating cycles the pressures in the two modulating chambers 51 and 63 are such that the transition of power is shifted from the clutch 75 to clutch 71. As the pressure increases in the modulating chamber 51 to a higher pressure the clutch 71 begins to carry the load and clutch 75 releases the load. Eventually, the complete load is shifted to clutch 71 from clutch 75. Then clutch 75 is completely disengaged and clutch 71 is completely engaged and carries the full load.

Accordingly, the transfer of power from one clutch to the other is automatically regulated in response to the accumulator operating pressure reducing valves connected between the source of pressurized fluid and the modulating chamber and also the pressure reducing valve between the modulating chamber and sump. The control of the modulation is automatically accomplished once the manual control shifts the spool of the manual control valve to the position desired.

The embodiments of the invention in which an exclusive property or privilege is claimed are defined as follows:

1. A hydraulic pressure modulating system comprising a first accumulator including a plunger defining a variable volume chamber, an accumulator spring means biasing said plunger to a minimum volume position, means defining a first pressure modulating chamber for connection to a first clutch, a modulator spring means in said modulating chamber, means defining a high pressure chamber, a first pressure reducing valve including a valve sleeve compressively positioned between said accumulator spring means and said modulator spring means, said valve sleeve selectively connecting said high pressure chamber with said modulating chamber and connecting said modulating chamber for discharge of fluid in response to operation of said plunger in said first accumulator, a second accumulator including a plunger defining a variable volume chamber, a second accumulator spring means biasing said second plunger to a minimum volume position, means defining a second modulating chamber for connection to a second clutch, a second modulator spring means in said second modulating chamber, a second pressure reducing valve including a second valve sleeve compressively positioned between said second accumulator spring means and said second modulator spring means, said second valve sleeve selectively connecting said high pressure chamber to said second modulating chamber and connecting said second modulating chamber for discharge of fluid in response to operation of said plunger in said second accumulator, a control valve for connection to a source of pressurized fluid and for selectively connecting said source of pressurized fluid to said high pressure chamber and one of said accumulators, and for discharge of fluid from the other of said accumulators and thereby modulate pressures of an increasing and decreasing rate simultaneously for selectively engaging and disengaging the respective clutches connected to said modulating chambers.

2. A hyraulic pressure modulating system as set forth in claim 1 wherein said pressure reducing valves include means defining passage means for connection to sump to thereby discharge hydraulic fluid from said modulating chambers to sump.

3. A hydraulic pressure modulating system as set forth in claim 1 wherein each of said pressure reducing valves includes a sleeve defining port means for selectively supplying pressurized fluid to the modulating chamber and for discharge of pressurized fluid to sump responsive to operation of said accumulator.

4. A hydraulic pressure modulating system as set forth in claim 1 wherein each of said valve sleeves defines a spring seat, said accumulator spring means in each of said accumulators defines a spring compressively positioned between said spring seat of said valve sleeve of said pressure reducing valve and said plunger of said accumulator to normally bias said valve sleeve toward a position providing communication between said high pressure chamber and said modulating chamber.

5. A hydraulic pressure modulating system as set forth in claim 1 wherein each of said valve sleeves defines a spring seat, said accumulator spring means in said accumulator defines a spring compressively positioned between said spring seat on said pressure reducing valve and said plunger, each of said modulator means defines a spring positioned in said modulating chamber compressively positioned to bias said valve sleeve against said accumulator spring means.

6. A hydraulic pressure modulating system as set forth in claim 1 wherein each of said valve sleeves define port means for selectively connecting the high pressure chamber to said modulating chamber and said modulating chamber to said sump, said accumulator spring means compressively positioned between said valve sleeve and said accumulator plunger biases said sleeve to a position providing communication between said high pressure chamber and said modulating chamber, said modulator spring means compressively positioned in said modulating chamber to bias said valve sleeve to provide communication between said modulating chamber and sump.

7. A hydraulic pressure modulating system as set forth in claim 1 wherein each of said pressure reducing valves includes said valve sleeve defining port means for selectively connecting said high pressure chamber to said modulating chamber and said modulating chamber to sump, said valve sleeve extending from said chamber in said accumulator to said modulating chamber through said high pressure chamber, said accumulator spring means biasing said plunger to a position placing communication from said high pressure chamber to said modulating chamber, said accumulator spring means biasing said valve sleeve for providing communication between said modulating chamber and sump.

8. A hydraulic pressure modulating system as set forth in claim 1 wherein each of said pressure reducing valves include said valve sleeve defining port means, said modulator spring means in said modulating chamber biasing said valve sleeve to a position for discharge of fluid from said modulating chamber when the mating of said accumulator plungers is in the minimum volume position.

9. A hydraulic pressure modulating system as set forth in claim 1 wherein said accumulators define a sump chamber for connection to sump, each of said pressure reducing valves includes said valve sleeve defining port means for selectively connecting the high pressure chamber with said modulating chamber and said modulating chamber to said sump.

10. A hydraulic pressure modulating system as set forth in claim 1 wherein each of said pressure reducing valves includes said valve sleeve defining port means, said accumulator spring means compressively positioned between said plunger of said accumulator and said valve sleeve to normally bias said valve sleeve to provide communication between said high pressure chamber and said modulating chamber through said port means when said plunger is biased to a maximum volume position.

* * * * *